Oct. 9, 1951

E. C. MOSS 2,570,967

GAUGING APPARATUS

Filed July 12, 1946

INVENTOR
E.C. MOSS
BY
W. C. Parnell
ATTORNEY

Oct. 9, 1951  E. C. MOSS  2,570,967
GAUGING APPARATUS
Filed July 12, 1946  2 Sheets-Sheet 2
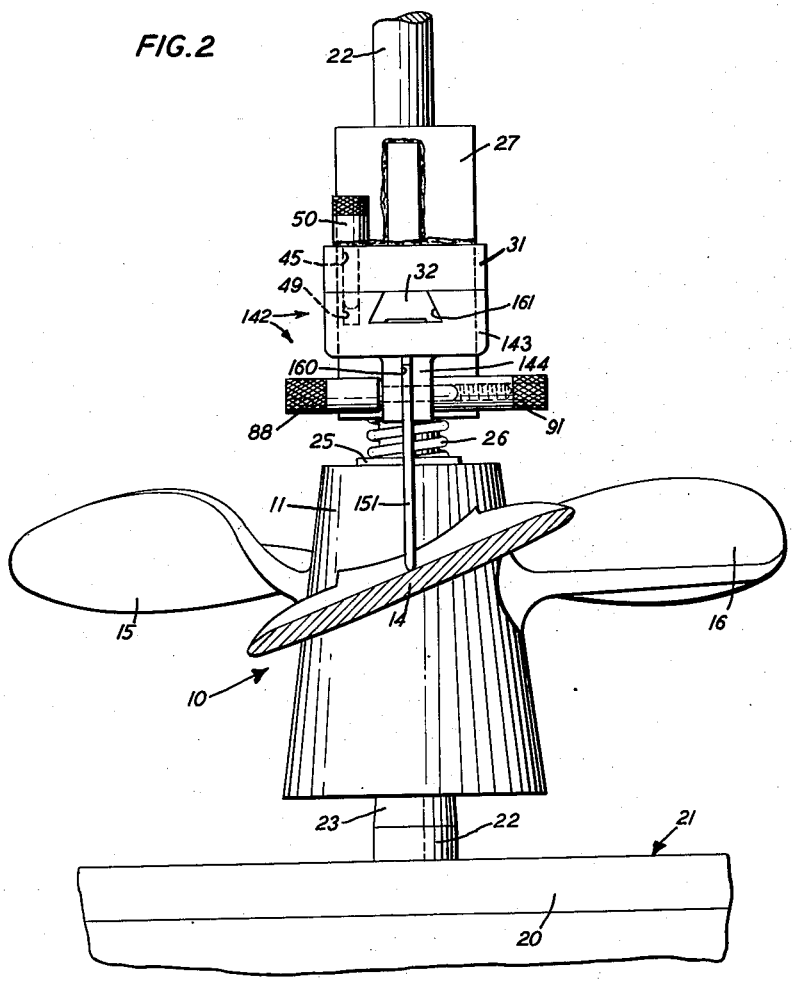
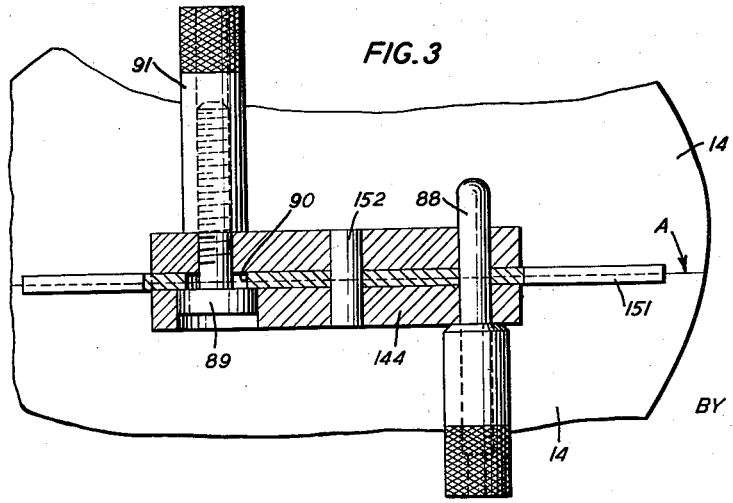
INVENTOR
E.C. MOSS
BY
W.C. Parnell
ATTORNEY Patented Oct. 9, 1951

2,570,967

UNITED STATES PATENT OFFICE 2,570,967

GAUGING APPARATUS

Earl C. Moss, Westfield, N. J., assignor to Western Electric Company, Incorporated, New York, N. Y., a corporation of New York Application July 12, 1946, Serial No. 683,181

5 Claims. (Cl. 33—174)

This invention relates to gaging apparatus and more particularly to apparatus for gaging location, form, and orientation of curved surfaces.

There are various instances in various arts in which an article has a part, portion or associated member formed with a curved surface whose form and positional relation to other elements of the article may be critically important. One illustrative example of such articles is the case of a two dimensional cam designed to be movable in more than one direction to effect an algebraic summation of two distinct motions in the motion of its follower. Such cams are found, for example, in various calculating devices and in some kinds of control devices. Another case of such an article is the ordinary screw propeller used in driving water borne vessels and air borne flying apparatus. Such screw propellers or "wheels," for short, are ordinarily multilobed, having two, three, or even more blades, and, naturally, must be carefully balanced, both statically and dynamically, to avoid troublesome vibration when run at high speed. Furthermore, since they act on and are reacted on by the fluid in and on which they work, it is necessary that their effective forms as well as their effective masses be accurately balanced against each other if vibration is to be avoided. If one blade, for example, be more effective in its thrust against the fluid than the others, it will tend to produce the same kind of vibrational perturbation as if it were out of dynamic balance with the other blades.

An object of the present invention is to provide a simple, effective, reliable, and durable apparatus for gaging an article of the general character above described.

With the above and other objects in view the invention may be embodied in an apparatus for gaging an article along a predetermined line thereon, means to hold an article to be gaged, movable means to support a gage body to be adjustably approximable to the article, a gage proper having a gaging edge thereon and tiltably supported on the gage body, means to releasably lock the gage proper to the gage body in a predetermined position thereon, and means to predeterminedly limit the motion of the gage proper on the gage body when the said locking means is released.

Other objects and features of the invention will appear from the following detailed description of an embodiment thereof taken in connection with the accompanying drawings in which the same reference numerals are applied to identical parts in the several figures and in which Fig. 1 is a view in left hand side elevation and partly in section of a gaging apparatus embodying the invention;

Fig. 2 is a view thereof in front elevation and partly in section;

Fig. 3 is an enlarged sectional view on the line 3—3 of Fig. 1;

Figure 1:
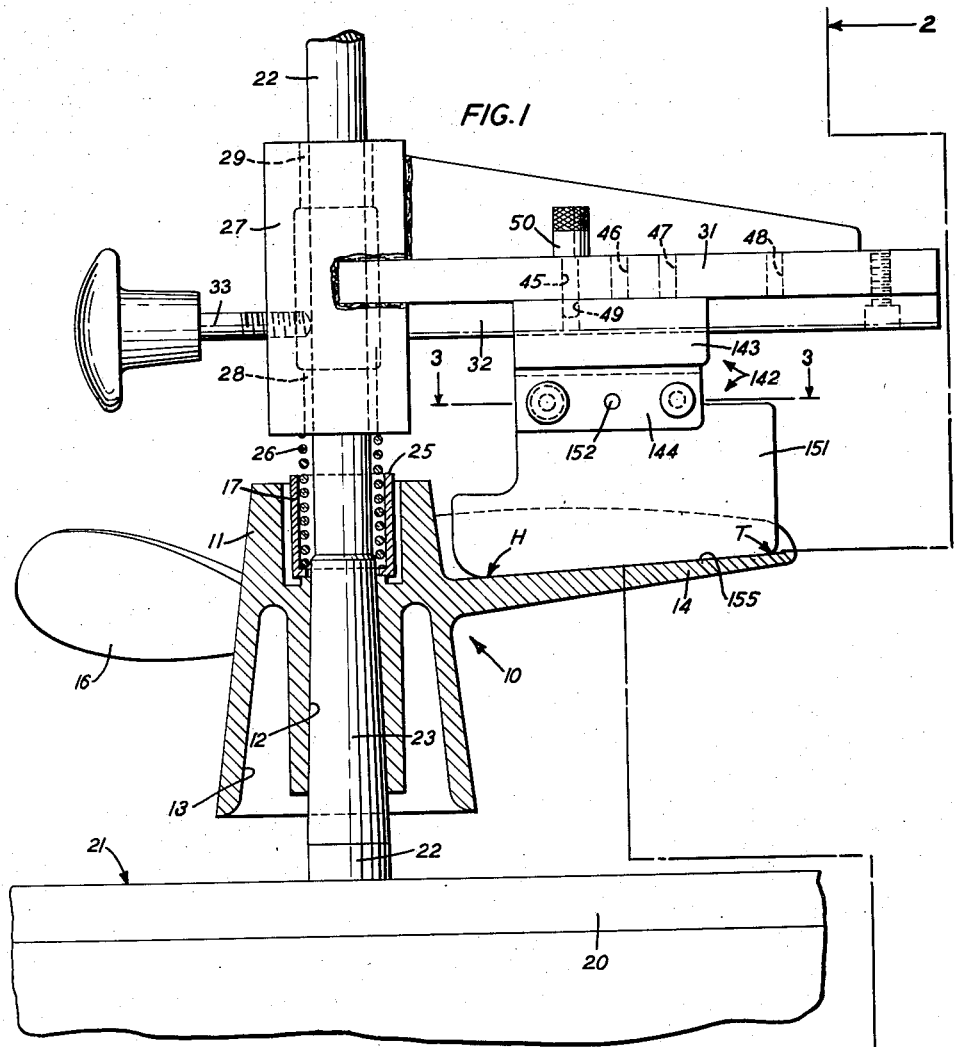

The illustrative embodiment of the invention herein disclosed is a gaging apparatus whose purpose is to gage the orientation of members radiating from a common axis of an article, the particular article selected for illustration being a three bladed marine propeller wheel, generally indicated at 10, which has a hub 11, formed with a downwardly wideningly tapered axial bore 12, an annular lightening recess 13, and three, identically similar, integral, radially disposed blades 14, 15 and 16. The upper part of the bore 12 is counterbored as at 17. The three blades being identically alike in form, any description of any one of them is also a description of either of the other two. The upper surfaces of the blades, as these are oriented in Figs. 1 and 2, are substantially true helicoids having for their common axis the axis of the bore 12, although near the edges of the blades they are chamfered and rounded down. Hence, the intersection of any vertical plane through the axis with the upper surface of a blade is a straight line over all the significant part of its length, which, in the particular high speed marine wheel selected for illustration here, is at less than a right angle upwardly to the axis and therefore is tilted up slightly in Figs. 1 and 2. There is in any blade one such line in particular, indicated at A in each of the blades 14, 15 and 16, such that, when the wheel is in operation, the integrated pressures over the areas on the two sides of the A line are equal and there is no torque about the A line as axis. It will be assumed, for present purposes, that a wheel to be gaged in the apparatus of the invention, has the A line of each blade already scribed or otherwise marked thereon.

The apparatus embodying the invention comprises a rigid base 20 having a flat, horizontal upper surface 21, the base 20 being rigidly supported by any suitable means, not shown. A vertical, stationary shaft 22 is rigidly mounted in the base with its axis accurately at right angles to the plane 21. The lower portion 23 of the shaft is tapered to fit snugly the tapered bore 12 of a wheel 10 and thus to support the wheel without any looseness or shake with its A lines at equal angles to the plane 21. Above the cone 23, the shaft is of slightly less diameter than the top of the cone and is accurately cylindrical.

A wheel 10, having been placed in position on the shaft 22, as shown, a counterbored collar 25 is placed down over the shaft to rest, as shown, on the hub 11 of the wheel. A helical spring 26 is slipped down over the shaft and into the counterbore of the collar to be supported by the collar. A large hub 27 is fitted down over the shaft to be supported on the spring, and is rotatable on the shaft in bearing members 28 and 29 accurately formed to allow the hub to rotate freely on the shaft but without looseness or shake.

At about mid-length of the hub 27 is rigidly mounted thereon a horizontally extending arm 31 to be rotatable about the shaft with the hub, and this arm is formed along its under side with an accurately radial male dovetail 32. A jam screw 33 mounted in the hub to bear at its end against the shaft 22 serves to releasably lock the hub in any adjusted position on the shaft.

A gage member generally indicated at 142 has a block 143 formed with a female dovetail 161 to fit slidably but without shake on the male dovetail 32 of the arm 31. The block 143 has an integral, downwardly depending radially directed lug 144, radially slotted to receive a plane laminar gage proper 151 dimensioned to fit movably but without shake in the slot 160 of the lug 144 and held therein with freedom to pivot slightly by a pin 152 positioned transversely through the lug 144 and gage plate 151 in appropriate bores therefor. A removable pin 88 is also provided fittable into appropriate bores in the lug and plate at a site radially offset from the pin 152 to hold the gage plate immovable in a predetermined normal position when desired. On the other side of the pin 152 and radially offset therefrom, a bolt 89 passes transversely through the plate and lug, apertures being provided in the lug, as best shown in Fig. 3 to fit the bolt head and bolt shank closely, while the aperture 90 in the plate 151 is of predeterminedly larger diameter than the shank of the bolt passing therethrough. The nut 91 for the bolt 88 is preferably shaped as an externally knurled cylinder to act as a manipulating handle together with the elongated knurled head of the pin 88.

The arm 31 is provided with a series of predeterminedly located vertical positioning bores 45, 46, 47 and 48; and the body 143 of the gage member 142 is provided with a single corresponding bore 49. A positioning pin 50 extending through one of the bores 45, 46, 47 and 48 into the bore 49 then serves to locate the gage member 142 radially on the arm 31 in the proper position for use in gaging a wheel of predetermined size.

In operation, a wheel 10 to be gaged is placed in position, as shown, on the shaft 22; and the hub 27 is brought down over the shaft 22 to rest on the spring 26 and be supported thereby with the gage plate 151 out of contact with the wheel blade 14. The nut 91 is loosened slightly on the bolt 89 and the removable pin 88 is placed in position as in Fig. 3 to hold the plate 151 so that the gage edge 155 is precisely at the predetermined, desired angle to the axis of the shaft 22 and therefor to the axis of the bore 12 of the wheel. The arm 31 is swung until the vertical plane of the plate 151 passes through the A-line of the blade 14; and the hub 27 and arm 31 are then brought vertically down against the tension of the spring 26 until the gage edge 155 touches the A-line of the blade, and the screw 33 is tightened to lock the parts in position.

If the blade 14 is correct as to the angle between its A-line and the axis, the gage edge 155 will make contact with the blade evenly along its A-line. If the angle is too great (small) the edge 155 will make point contact only with the A-line of the blade at the heelpoint H (toepoint T) of the gage plate 151, and, if desired, a suitable feeler or wedge may be inserted between the A-line and the toepoint T (heelpoint H) to measure the amount of departure from the desired norm. The same procedure may then be carried out with each of the blades 15 and 16, and thus the individual departures of all three blades from the angular norm may be accurately determined.

It may be the case in some instances that the individual absolute errors are not materially significant, provided all three blades are similarly in error within limits. In such a case, the gage plate 151 will be brought as above described into registry and contact with the A-line of the blade 14, but with the pin 88 removed. The plate 151 is then free to rock on the pin 152, within the limits permitted by the bolt 89 in the aperture 90.

Figure 4:
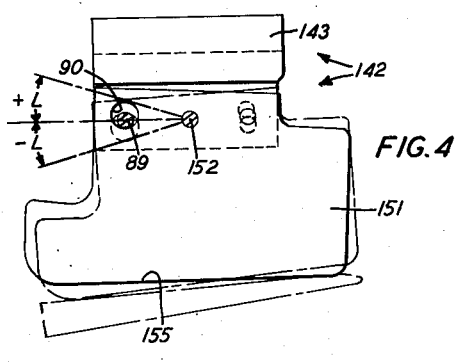
Fig. 4 is a detached view in side elevation and partly in section of the gage member.

If the edge 155 cannot be brought to bear its length on the A-line of the blade, the latter is outside the tolerable limits of angular error, exaggeratedly indicated at +L and —L in Fig. 4. Ordinarily the error will be within these limits and it will be possible to bring the edge 155 to lie snugly along the A-line of the blade 14 as it does in the ideal case pictured in Fig. 1, but at a slightly different angle to the axis. With the parts in this position, the nut 91 is drawn tight on the bolt 89 to lock the plate 151 in its then position in the lug 144. The hub 27 is lifted and turned 120°, say clockwise from above; and the edge 155 is brought down on the A-line of the blade 15, and the difference of tilt of the blades 14 and 15 is measured by measuring the angle between the edge 155 and the A-line of the blade 15. Similarly the difference of tilt of the blades 14 and 16 is determined.

Figure 5:
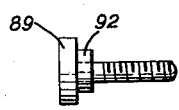
Fig. 5 is a detached view of the locking bolt.

Thus either the absolute departure of the angle of each blade to the axis from its proper value may be individually accurately determined; or the difference between the angles of the several blades may be determined. Or, if desired, the absolute value of the error in any one blade may be first determined, the pin 88 then removed and the differential errors of the other two blades with respect to the first one determined. Furthermore, if a collar 92 (Fig. 5) or a series of such collars of different diameters, all less than the diameter of the aperture 90, be provided, to fit snugly on the shank of the bolt 89 and to be interchangeable thereon, then the limits +L and —L can be correspondingly altered to suit the requirements of various degrees of permitted tolerance.

The present application is one of a group of five copending applications filed on the same date by the same inventor and closely related, being directed to various modifications of one apparatus for various purposes, the other four applications being Serial Nos. 683,179, 683,180, 683,182, and 683,183. Each of this group of applications discloses features disclosed in one or more of the others and claimed in one of the others, the drawings being made from an apparatus modifiable by removal, exchange, or addition of parts to embody and subserve the purposes of each of the several inventions of the group. Applicant does not intend the disclosure here of patentable novelty not claimed herein to be a dedication to the public of such novelty, but has presented claims to such features in one or other of copending applications, Serial Nos. 683,179, 683,180, 683,182, and 683,183. Application S. N. 683,179 is abandoned while application S. N. 683,180 has matured into Patent No. 2,470,636, granted May 17, 1949.

What is claimed is:

1. In an apparatus for gaging an article along a predetermined line thereon, a base, means on the base to hold an article to be gaged, an arm slidably and rotatably carried on the holding means to support a gage body to be adjustably approximable to the article, the body being formed with a slot therein, a laminar gage proper having a gaging edge thereon and pivoted in the slot, a removable pin to lock the gage proper in one fixed position relative to the body, and means to predeterminedly limit the pivotal motion of the gage proper in the slot when the pin is removed.

2. In an apparatus for gaging an article along a predetermined line thereon, a base, means on the base to hold an article to be gaged, an arm slidably and rotatably carried on the holding means to support a gage body to be adjustably approximable to the article, the body being formed with a slot therein, a laminar gage proper having a gaging edge thereon and pivoted in the slot, and a clamping bolt and nut to releasably clamp the gage proper to the body and mounted in the body and passing through an oversized aperture in the gage proper.

3. In an apparatus for gaging an article along a predetermined line thereon, a base, means on the base to hold an article to be gaged, an arm slidably and rotatably carried on the holding means to support a gage body to be adjustably approximable to the article, the body being formed with a slot therein, a laminar gage proper having a gaging edge thereon and pivoted in the slot, a removable pin to lock the gage proper in one fixed position relative to the body, and a clamping bolt and nut to releasably clamp the gage proper to the body and mounted in the body and passing through an oversized aperture in the gage proper.

4. A gaging apparatus comprising a base, a member on the base to support an article to be gaged, a gaging body slidably and rotatably mounted on the supporting member and thereby movable on the member into and out of corresponding predetermined positional relationship with any of a plurality of specific portions of the article to be gaged, the body being formed with a slot therein, means for releasably locking the body to the shaft, a laminar gage proper having a gaging edge thereon and pivoted in the slot, a removable pin to lock the gage proper in one fixed position relative to the body, and a clamping bolt and nut to releasably clamp the gage proper to the body and mounted in the body and passing through an oversized aperture in the gage proper.

5. A gaging apparatus comprising a horizontal base, a vertical shaft rigidly supported in the base and dimensioned to fit the bore in an article to be gaged, an arm both slidably and rotatably mounted on the shaft, resilient means loosely positioned on the shaft and interposed between the arm and an article positioned on the shaft to resiliently support the arm on the shaft, a gaging body mounted on the arm and thereby movable on the shaft into and out of corresponding predetermined positional relationships with any of a plurality of specific portions of the article to be gaged, the body being formed with a slot therein, means for releasably locking the arm to the shaft, a laminar gage proper having a gaging edge thereon and pivoted in the slot, a removable pin to lock the gage proper in one fixed position relative to the body, and a clamping bolt and nut to releasably clamp the gage proper to the body and mounted in the body and passing through an oversized aperture in the gage proper.

EARL C. MOSS.

REFERENCES CITED

The following references are of record in the file of this patent:

UNITED STATES PATENTS

| Number | Name | Date |
|---|---|---|
| 842,585 | Ross | Jan. 29, 1907 |
| 996,901 | Ball | July 4, 1911 |
| 1,065,994 | Williams | July 1, 1913 |
| 1,453,067 | Felske | Apr. 24, 1923 |
| 1,547,380 | Godfrey | July 28, 1925 |
| 1,582,249 | Cumiskey | Apr. 27, 1926 |
| 1,597,357 | Godfrey | Aug. 24, 1926 |
| 2,412,569 | Dugger | Dec. 17, 1946 |